July 10, 1962    R. S. BLOUGH    3,043,267
LIVESTOCK DRINKING CUP
Filed Sept. 1, 1960    2 Sheets-Sheet 1
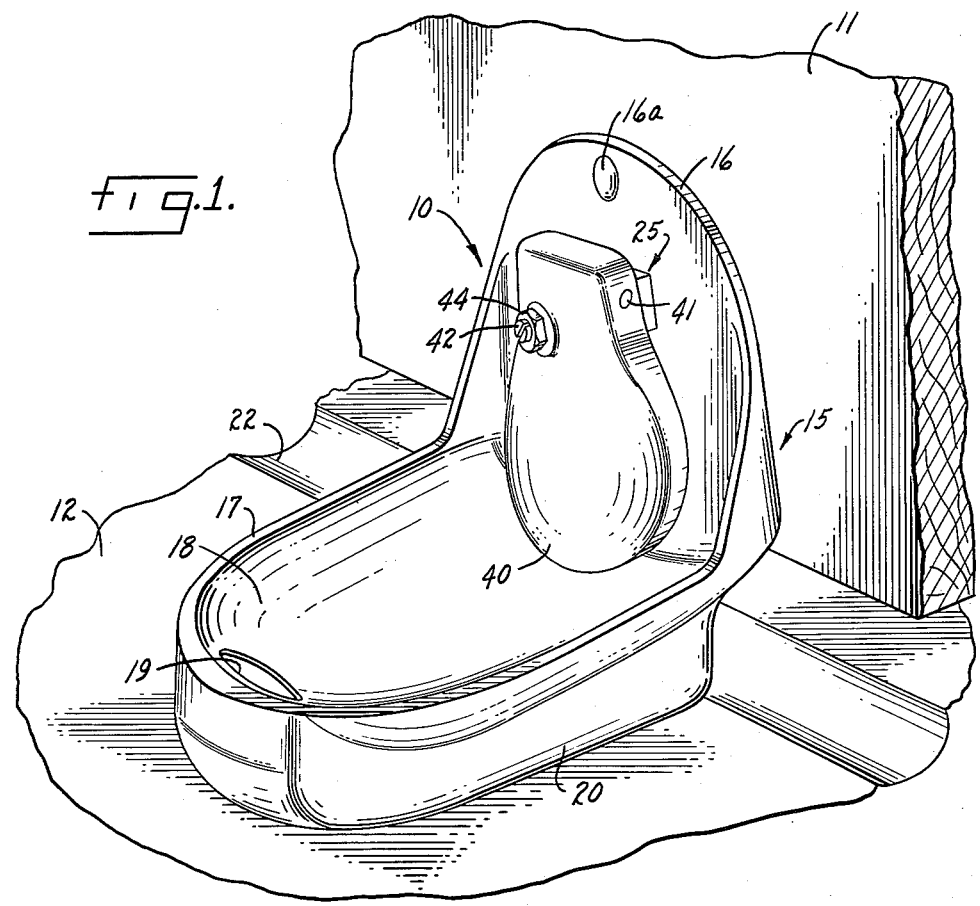
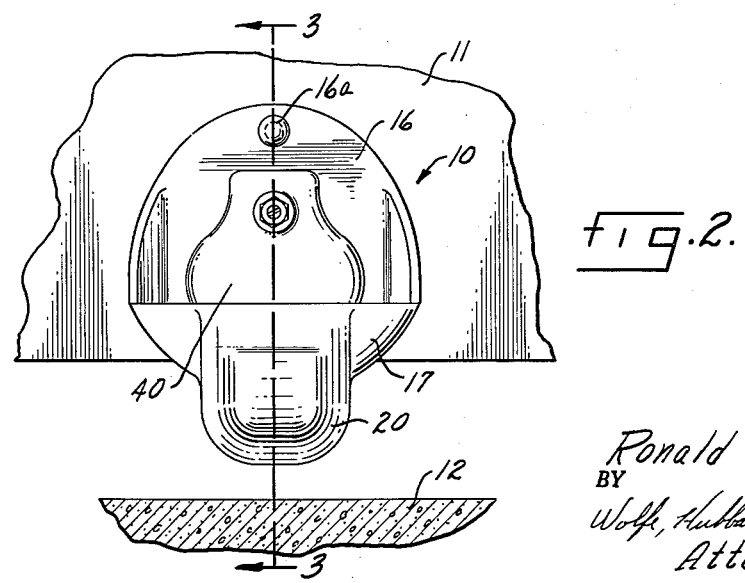
INVENTOR.
Ronald S. Blough,
BY
Wolf, Hubbard, Voit & Osann
Attorneys.

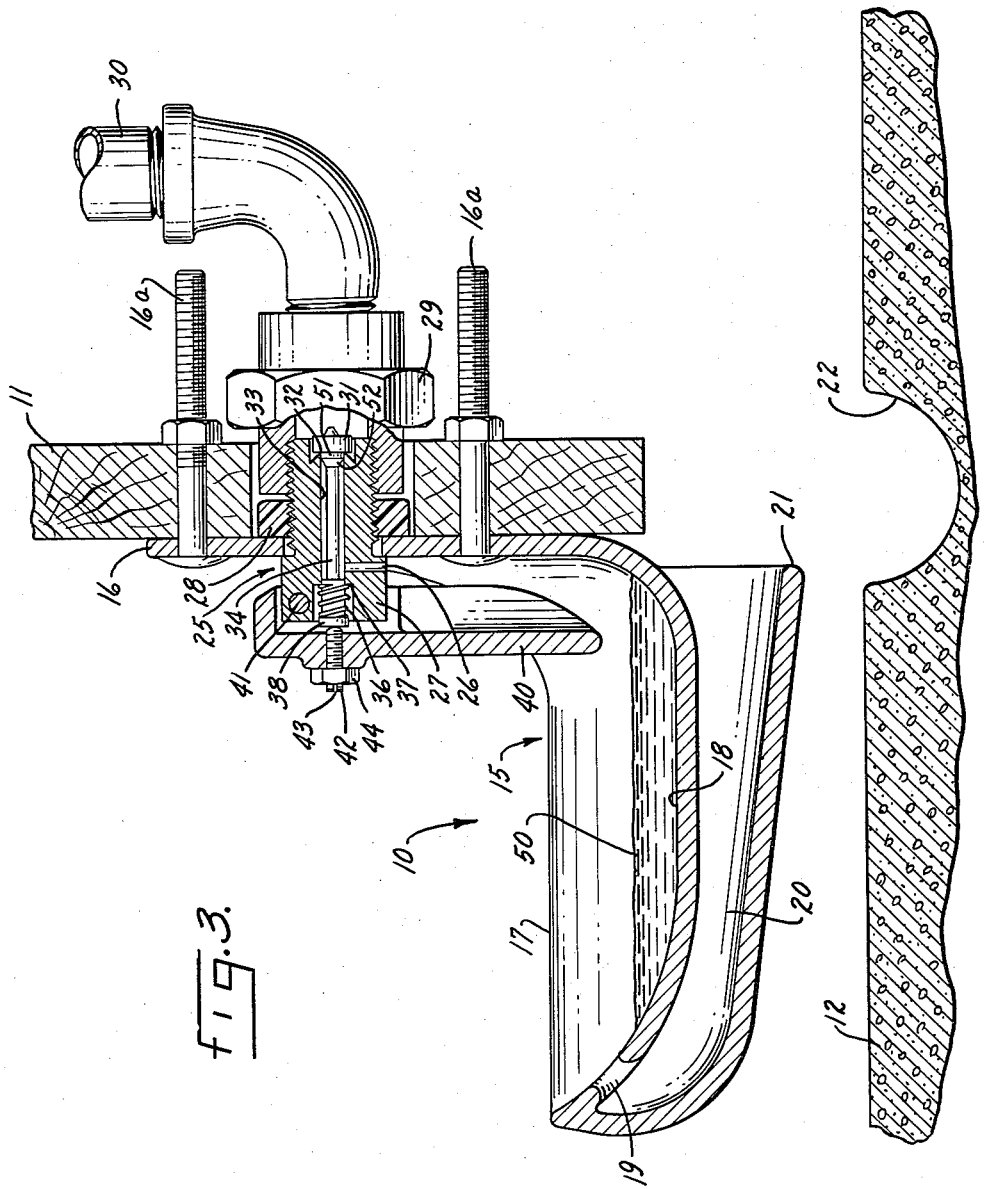

3,043,267
LIVESTOCK DRINKING CUP
Ronald S. Blough, Fairfield, Iowa, assignor to Fairfield Engineering and Manufacturing Company, Fairfield, Iowa, a corporation of Iowa
Filed Sept. 1, 1960, Ser. No. 53,415
6 Claims. (Cl. 119—75)

This invention relates to livestock watering devices and concerns, more particularly, a hog and pig drinking cup.

It is the primary aim of the present invention to provide a sanitary drinking cup for watering pigs and hogs. More particularly, it is an object of the invention to provide a drinking cup of the above character that is self-cleaning and self-flushing, and which does not permit standing water to become stagnant or foul.

Another object of the invention is to provide a cup as described above which allows the animal to serve himself as much fresh water as desired without water waste or spillage and without tempting the pigs to "play" in the supply of drinking water. The drinking cup of the invention easily waters pigs ranging in age from one week to full maturity.

With more detail, it is an object to provide a drinking cup of the above type which causes the drinking animals themselves to brush away larger particles of foreign material which might settle in the cup and to flush dirt and smaller foreign particles from the pen area. Each time the cup is used, it is flushed clean.

Yet another object is to provide a drinking cup as referred to above that can be easily adjusted for proper operation with all commonly encountered water pressures and which avoids water "hammer," even at high water pressures, so as not to startle or annoy the animals using the cup.

It is also an object to provide a drinking cup as characterized above that is economical to manufacture and which can be easily and conveniently installed.

Other objects and advantages of the invention will become apparent upon reading the following detailed description and upon reference to the drawings, in which:

FIGURE 1 is a perspective of a drinking cup constructed in accordance with the present invention and mounted in an animal pen;

FIG. 2 is an end elevation of the cup shown in FIG. 1; and

FIG. 3 is a longitudinal section taken approximately along the line 3—3 of FIG. 2.

While the invention will be described in connection with a preferred embodiment, it will be undestood that I do not intend to limit the invention to that embodiment. On the contrary, I intended to cover all alternatives, modifications and equivalents as may be included within the spirit and scope of the invention as defined by the appended claims.

Turning now to the drawings, there is shown a drinking cup 10 constructed in accordance with the invention and mounted on a wall 11 defining one end of a pen area having a floor 12. The illustrated cup 10 is particularly intended for pigs and hogs and hence is positioned just above the level of the floor 12 so as to be readily accessible to young pigs as well as mature hogs.

Pursuant to the invention, the cup 10 includes a unitary body 15 including a back panel 16 and a bowl 17. The back panel 16 is bolted directly to the wall 11 by a plurality of bolts 16a so as to rigidly mount the cup 10 in the desired position. The bowl 17 is formed with a shallow rounded bottom 18 which is slightly elongated in a direction perpendicular to the wall 11.

A drain opening 19 is formed at one end of the bowl bottom 18 with the drain opening being slightly above the level of the bottom of the bowl. As can be best seen in FIG. 3, the bowl surface in which the drain opening 19 is disposed slopes at a fairly shallow angle from the bottom 18 to the rim of the bowl 17.

In the preferred construction, the bowl 17 is double walled so as to define a conduit 20 leading from the drain opening to a spout 21 emptying behind the back panel 16. In the illustrated installation, water flowing through the opening 19 is conducted by the conduit 20 to the spout 21 where it falls into a gutter 22 positioned beneath the wall 11 so as to be inaccessible to the animals in the pen.

Carrying out the invention, a valve 25 having a nozzle opening 26 is mounted on the cup body 15 so that the nozzle opening is aimed down into the bowl 18 at the side opposite the drain opening 19. The valve is positioned in order that a stream of water from the nozzle 26 strikes the shallow bowl 18 and sweeps throughout the length of the bowl to the drain opening 19 so as to completely flush the bowl. In the illustrated assembly, the valve 25 includes a valve body 27 anchored to the cup back panel 16 by a nut 28. A coupling 29 joins the valve body to a line 30 which is connected to a source of water under pressure.

The valve is closed by the engagement of a resilient sealing member 31 on an annular seat 32 that surrounds an inlet opening 33 through which water is passed from the conduit 30 to the valve nozzle 26. The sealing member 31 is carried by a valve stem 34 which is shiftable within the inlet opening 33.

For holding the valve 25 normally closed a compressed spring 36 is mounted about the valve stem 34 between a shoulder 37 formed on the valve body 26 and a collar 38 formed on the valve stem. The valve stem 34 is thus urged to the left in FIG. 3 so as to hold the sealing member 31 against the valve seat 32 and thus block the end of opening 33 from the water line 30.

In keeping with the invention, a shiftable paddle 40 is mounted on the body 15 so as to extend down toward the bottom 18 of the cup bowl, and the paddle is coupled to the valve stem 34 so as to operate the valve. Preferably, the paddle 40 is formed with a shield-like configuration and is positioned so as to cover the nozzle 26 and adjacent portions of the valve 25. In the illustrated embodiment, the paddle is pivoted on a pin 41 which passes through the valve body 27 so that the paddle 40 is free to swing about a horizontal axis toward and away from the valve. For coupling the paddle to the valve 25, an operator in the form of a screw 42 is threaded into the paddle 40 so as to abut the end of the valve stem 34. A slot 43 is formed in the exposed end of the operator screw 42 so that by using a simple tool such as a screw driver the screw can be rotated and adjustably positioned in the paddle. To hold the screw 42 in an adjusted position, a nut 44 is threaded on the screw so that by tightening the nut against the paddle 40 the screw can be locked relative to the paddle.

When installed, the operator screw 42 is positioned so that movement of the paddle 40 against the valve body 27, in a counterclockwise direction as seen in FIG. 3, opens the valve 25 sufficiently far to direct a strong stream of water from the nozzle 26 along the bottom bowl 18 and out the drain opening 19 without spilling from the cup.

The operation of the cup 10 can now be appreciated. A small quantity of water 50 is normally left standing in the bottom 18 of the cup so as to attract the animals' attention when they desire to drink. The water remains in the cup because of the position of the drain opening 19 slightly above the bowl bottom 18. When the pig or hog moves to drink the water 50, the animal's nose pushes the paddle 40 against the valve body 27 so as to open the valve 25 and cause a stream of water to be directed from the valve nozzle 26 into the bowl 17. This stream of water accomplishes the double function of providing drinking water for the animal as well as to sweep forward through the drain opening 19 so as to clean and flush the bowl 17 of dust, dirt and small foreign particles which may have settled in the bowl. The low position of the cup, its shallow bottom 18, and the ease with which the paddle 40 is contacted, permits pigs from one week to full maturity to use the cup quite readily.

It is also important to note that the slightly rounded shape of the bowl bottom 18 and the gentle angle at which the drain opening 19 is disposed permits the drinking animals to inherently clean out the larger particles of material which might fall into the cup. In other words, when the animal is drinking, straw and similar foreign particles are brushed aside by the animal's snout and his "chin" sweeps over the drain opening 19 so as to keep it open and functioning properly.

While the animal is drinking, the stream of water which flushes the bowl 18 through the drain opening 19 is directed by the conduit 20 to the spout 21 and the discharge gutter 22. Water does not spill from the drinking cup nor does a large quantity of water accumulate at any point accessible from the pen area. Thus, the animals are discouraged from "playing in" their drinking water supply and this contributes toward keeping the water supply sanitary and also prevents the splashing of water about the pen area. Since the water flows through the valve 25 only when the animal is actually drinking, there is little water wastage as would be the case with a continuously flowing stream.

To prevent water "hammer" even when the drinking cup 10 is used with relatively high pressure water systems, the valve stem 34 is provided with a cylindrical shoulder portion 51 adjacent to the member 31 and which fits loosely within the inlet opening 33 of the valve. The shoulder portion 51 tapers down at 52 to the diameter of the valve stem. It can thus be seen that the valve 25 is not fully open until the sealing member 31 is lifted from the valve seat 32 and the cylindrical portion 51 is slid from the inlet opening 33. The loose fit of the cylindrical portion 51 within the end of opening 33 permits a limited flow of water through the valve 25 as soon as the sealing member 31 is unseated. The limited flow continues until the portion 51 clears the opening 33 and, at that time, the sealing member 31 is spaced sufficiently far from the seat 32 to avoid very high velocity water flow through the valve which could cause hammering vibration of the member 31 against the seat 32. As a result, the flow of water begins smoothly as the valve is opened and does not stop abruptly as the valve is closed and, in this way, water hammer is avoided even at fairly high water pressures such as 80 pounds per square inch. The avoidance of water hammer in the system prevents drinking animals from being startled or annoyed when using the cup 10.

Those familiar with this art and the manufacturing techniques involved will appreciate that the cup 10 can be economically constructed, and it will be evident that installation is quite simple.

I claim as my invention:

1. An animal drinking cup comprising, in combination, a body adapted to be fixed within an animal pen, said body defining a shallow bowl formed with a rounded bottom, said bowl having a drain opening at one side slightly above the bottom level of the bowl, a valve mounted on said body having a nozzle opening aimed down into said bowl at the side opposite said drain opening so that a stream of water from said nozzle flushes the bowl through said drain opening, means on said body defining a conduit for discharging water from said drain opening clear of said pen, a shiftable paddle mounted on said body so as to cover said nozzle and extend down toward the bottom of said bowl, an operator for said valve coupled to said paddle so that shifting of the paddle by a drinking animal's nose opens said valve to supply water to said bowl and flush the bowl clean.

2. An animal drinking cup comprising, in combination, a body adapted to be fixed within an animal pen, said body defining a bowl having a drain opening at one side slightly above the bottom level of the bowl, a valve mounted on said body having a nozzle opening aimed down into said bowl at the side opposite said drain opening so that a stream of water from said nozzle flushes the bowl through said drain opening, means on said body defining a conduit for discharging water from said drain opening clear of said pen, a shiftable paddle mounted on said body and carrying an operator for said valve so that shifting of the paddle by a drinking animal's nose opens said valve to supply water to said bowl and flush the bowl clean, said operator being adjustable so as to vary the extent said valve is opened and thus adjust the flow rate from said nozzle.

3. An animal drinking cup comprising, in combination, a body having a back panel adapted to be secured within an animal pen, said body including a bowl portion integral with said back panel and defining a slightly enlongated shallow bowl with a rounded bottom extending from said back panel, said bowl having a drain opening in one side slightly above the bottom level of the bowl, a valve mounted on said frame having a nozzle opening aimed down into said bowl at the side opposite said drain opening so that a stream of water from said nozzle flushes the bowl through said drain opening, said bowl portion being double walled so that the space between said double walls defines a conduit leading from said drain opening to behind said back panel, a shiftable paddle mounted on said frame so as to cover said nozzle and extend down toward the bottom of said bowl, an operator for said valve coupled to said paddle so that shifting of the paddle by a drinking animal's nose opens said valve to supply water to said bowl and flush the bowl clean.

4. An animal drinking cup comprising, in combination, a body adapted to be fixed within an animal pen, said body defining a shallow bowl formed with a rounded bottom, said bowl having a drain opening in one side slightly above the bottom level of the bowl, a valve body mounted on said frame having a nozzle opening aimed down into said bowl at the side opposite said drain opening so that a stream of water from said nozzle flushes the bowl through said drain opening, means on said frame defining a conduit for discharging water from said drain opening clear of said pen, a shiftable valve stem slideably mounted in an inlet opening formed in said valve body, said stem carrying a sealing member for closing said inlet opening and being biased toward closed position, a paddle pivoted on said valve body and being shaped to cover the body and extend down toward the bottom of said bowl, means coupling said paddle and said valve stem so that swinging movement of the paddle toward said valve body opens said valve, said means being adjustable so as to vary the distance the valve stem is moved when the paddle is pushed against the valve body and thus adjust the flow rate from said nozzle.

5. An animal drinking cup comprising, in combination, a body adapted to be fixed within an animal pen, said body defining a shallow bowl formed with a rounded bottom, said bowl having a drain opening in one side slightly above the bottom level of the bowl, a valve body mounted on said frame having a nozzle opening aimed down into said bowl at the side opposite said drain opening so that a stream of water from said nozzle flushes the bowl through said drain opening, means on said frame defining a conduit for discharging water from said drain opening clear of said pen, a shiftable valve stem slideably mounted in an inlet opening formed in said valve body, said stem carrying a sealing member for closing said inlet opening and being biased toward closed position, a paddle pivoted on said valve body and being shaped to cover the body and extend down toward the bottom of said bowl, means coupling said paddle and said valve stem so that swinging movement of the paddle toward said valve body opens said valve, said valve stem having a shoulder portion substantially filling said inlet opening so as to restrict fluid flow through the inlet opening as the valve is being opened and closed and thus avoid water hammer.

6. An animal drinking cup comprising, in combination, a body having a back panel adapted to be secured within an animal pen, said body including a bowl portion integral with said back panel and defining a slightly elongated shallow bowl with a rounded bottom extending from said back panel, said bowl having a drain opening in one side slightly above the bottom level of the bowl, a valve body mounted on said frame having a nozzle opening aimed down into said bowl at the side opposite said drain opening so that a stream of water from said nozzle flushes the bowl through said drain opening, said bowl portion being double walled so that the space between said double walls defines a conduit leading from said drain opening to behind said back panel, a shiftable valve stem slideably mounted in an inlet opening formed in said valve body, said stem carrying a sealing member for closing said inlet opening and being biased toward closed position, a paddle pivoted on said valve body and being shaped to cover the body and extend down toward the bottom of said bowl, means coupling said paddle and said valve stem so that swinging movement of the paddle toward said valve body opens said valve, said means being adjustable so as to vary the distance the valve stem is moved when the paddle is pushed against the valve body and thus adjust the flow rate from said nozzle, and said valve stem having a shoulder portion substantially filling said inlet opening so as to restrict fluid flow through the inlet opening as the valve is being opened and closed and thus avoid water hammer.

References Cited in the file of this patent

UNITED STATES PATENTS 2,764,960   Ferris ------------------ Oct. 2, 1956

FOREIGN PATENTS 335,322   Great Britain ----------- Sept. 25, 1930